UNITED STATES PATENT OFFICE 2,692,879

METHOD OF PREPARING N-SUBSTITUTED MORPHOLINES

Ralph A. Hales, West Chester, Pa., assignor to Atlas Powder Company, Wilmington, Del., a corporation of Delaware No Drawing. Application November 3, 1950, Serial No. 194,031

8 Claims. (Cl. 260—247)

This invention relates to the preparation of derivatives of morpholines and more particularly to an improved method for the preparation of N-substituted morpholine, N-substituted thiamorpholine, and certain of their homologues.

Morpholines in which the nitrogen is substituted by acyclic aliphatic hydrocarbon radicals are known compounds useful in the synthesis of quaternary morpholinium compounds which are cationic agents exhibiting valuable germicidal and deodorant properties.

It is an object of this invention to provide an improved method of producing N-substituted morpholine compounds.

A further object is to provide a method for producing morpholine compounds in which the nitrogen is substituted by acyclic aliphatic hydrocarbon radicals in good yield and in short reaction time.

The above and other objects will become apparent in the course of the following description and the appended claims.

The process of the present invention comprises the steps of heating and reacting together an acyclic aliphatic amine and a $\beta\beta'$ dichlor-lower alkyl ether, the ether being present in from 2 to 5 times the stoichiometric quantity, in the presence of an acid acceptor, which is preferably an alkali metal carbonate or an alkali metal hydroxide, and in the presence of water to dissolve the formed salt; and recovering the resulting N-substituted morpholine from the reaction mixture. It is preferred, though not essential, in carrying out the process of the invention to include the step of mechanically separating the immiscible water phase containing the dissolved salt formed in the reaction and the excess alkaline compound before recovering the sought product from the organic liquid phase.

Amines which may be used in the process of the invention may be generically represented by the formula R—NH$_2$ wherein R is an acyclic aliphatic hydrocarbon radical containing from 10 to 20 carbon atoms in straight or branched chain, saturated or unsaturated. Specific radicals encompassed within the above definition of R include decyl, dodecyl, tri-isobutyl, cetyl, oleyl, stearyl, and the like. Within the purview of the invention also, the process may be carried out employing mixtures of amines such as those obtained by converting the carboxyl radical of mixed fatty acids obtainable from naturally occurring fats and oils to the —CH$_2$NH$_2$ radical. For the purpose of this specification and in the appended claims the radical "R" will be referred to as "alkyl" it being understood that the term is here extended to include unsaturated as well as saturated radicals. Similarly the hydrocarbon radicals of the mixed amines from naturally occurring fats and oils will be designated by their source as for example "soya alkyl," "coconut alkyl" and the like. Preferred amines for carrying out the process of the invention are the straight chain amines containing from 12 to 18 carbon atoms, and particularly "soya alkyl" amine.

The dichlor lower alkyl ethers suitable for reaction with the amines above described in carrying out the process of the invention are those of the formula ClCH$_2$CH$_2$XCH$_2$CH$_2$Cl, wherein X is oxygen or sulfur and homologues thereof in which one or more of the hydrogen atoms are replaced by methyl. Specific compounds so defined include $\beta\beta'$ dichlorethyl ether, $\beta\beta'$ dichlorethyl thioether, $\beta\beta'$ dichlor isopropyl ether, and the like. The preferred ether is $\beta\beta'$ dichlorethyl ether.

The products of the reaction are compounds of the generic formula

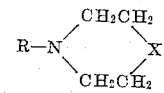

and homologues thereof containing one or more methyl groups replacing hydrogen in the morpholine ring, R and X having the significance previously indicated.

It has been found, in accordance with the present invention, that when the dichlor-alkyl ether is present in the reaction mixture in great excess, i. e. from 2 to 5 times the stoichiometric quantity, the reaction proceeds more rapidly and conversion of the amine to the desired N-substituted morpholine occurs in higher yield and in a shorter time than when no excess or a nominal excess of, for example, 10% is employed. This effect is completely unexpected when it is considered that both reactants are bifunctional and the presence of a large excess of either reactant should be expected to promote ring-blocking condensations rather than ring-closing condensations.

An acid acceptor is employed in the reaction mixture to consume the hydrochloric acid liberated by the condensation, converting it to a salt. Suitable acid acceptors are the alkali metal carbonates and alkali metal hydroxides, sodium carbonate being the preferred compound for this purpose. It is employed in moderate stoichiometric excess (based on the amine employed) the amount being otherwise non-critical.

In accordance with the invention the reaction mixture also contains water in which neither of the organic reactants are soluble but which seems to promote the reaction, resulting in good yields and short reaction times. It serves also to dissolve the formed salt and excess alkali and carry them into an aqueous phase readily separable from the N-substituted morpholine product which remains in the organic liquid phase. The amount of water in the reaction mixture is preferably sufficient to dissolve the formed salt but otherwise is not critical.

The N-"alkyl" morpholines may be recovered from the reaction mixture in any suitable manner. Preferably the aqueous phase is mechanically separated thereby removing the formed salt and excess alkali. Alternatively, however, the reaction mixture may be evaporated to remove the water and excess ether, and the precipitated salt filtered off. Depending upon the purity requirements, the reaction product may then be simply subjected to vacuum stripping, or washed by extraction with water and vacuum stripped, or distilled under high vacuum. These steps are well known in the art and need not be further elaborated.

The following examples illustrate the improved method of preparation of N-substituted morpholines in accordance with the invention but are not to be construed as defining the limits of the invention.

*Example I*

95.2 grams (0.5 mol) of a commercial lauryl amine, 143 grams (1.0 mol) of dichloroethyl ether, 500 ml. of water, and 61 grams of sodium carbonate were heated in an agitated flask to 101° C., and held at that temperature for 6 hours. The water and excess ether were removed by distillation under vacuum, the insoluble salt filtered from the mixture and washed with ethyl alcohol. The dried recovered salt weighed 65.8 grams, and contained 89.4% NaCl. The sodium chloride formed is thus equivalent to that from 0.5 mol of dichlorethyl ether. The filtrate and alcohol wash solution were combined and the solvent removed under vacuum. The product was then distilled at 1 mm. pressure to yield 127.6 g. of product containing 90.6% N-lauryl morpholine by analysis. This corresponds to 89% conversion of the lauryl amine to N-lauryl morpholine.

*Example II*

A condensation employing the same reactants in the same proportion was carried out under the same conditions as in Example I except that the time at 101° was changed from 6 hours to 23 hours. The recovered sodium chloride corresponded to .53 mol of dichlorethyl ether reacted, and the conversion of amine to N-lauryl morpholine was 90.5%.

*Example III*

1850 grams (6.5 mols) of a commercial "soya alkyl" amine, 2790 grams (19.5 mols) of dichlorethyl ether, 4335 grams of water, and 1180 grams of soda ash (87.5%) were stirred and heated to a temperature of 102° C. and held at that temperature for 23 hours. Heating and agitation were stopped and the phases allowed to separate. The lower aqueous phase containing the dissolved salt of reaction and any excess alkali was drawn off. The upper layer was divided and half of it washed once by agitating with 542 grams of water, allowing the phases to separate and drawing off the aqueous layer. The washed, organic liquid layer was vacuum stripped to remove unreacted ether and any water retained therein, to yield 948 grams of N-"soya" morpholine containing 87% tertiary amine. The remaining half of the divided upper layer was not purified by washing. It was vacuum stripped to yield 1170 grams of a crude product containing 77% N-"soya" morpholine.

By carrying out the reaction under pressure the reaction temperature can be raised and the time of reaction markedly shortened without sacrifice of yield or quality. For example, at 125° C., maintaining a pressure of 30 p. s. i., a reaction corresponding to that of Example III may be carried out in 2 hours.

It is preferred to employ at least 3 mols of dichlorethyl ether per mol of amine when the aqueous layer is to be separated at atmospheric pressure. With smaller excess of dichlorethyl ether, the separation into layers is very low at temperatures below the normal boiling point of water.

Modifications which come within the purview of the invention will readily suggest themselves to those skilled in the art from the above description and specific illustrations of the improved method.

What is claimed is:

1. The method of preparing N-substituted morpholines which comprises heating and reacting one molar proportion of an acyclic aliphatic amine containing from 10 to 20 carbon atoms with from 2 to 5 molar proportions of a ββ' dichlor-lower alkyl ether, in the presence of an acid acceptor to neutralize the acid formed in the reaction, and in the presence of water to dissolve the formed salt, and recovering the said N-substituted morpholines from the reaction mixture.

2. The method of preparing a compound of the formula

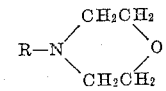

wherein R is an acyclic aliphatic hydrocarbon radical containing from 10 to 20 carbon atoms which comprises heating together and reacting one molar proportion of an amine of the formula R—MN₂ with from 2 to 5 molar proportions of ββ' dichlorethyl ether, in the presence of an acid acceptor selected from the group consisting of alkali metal carbonates and alkali metal hydroxides, and in the presence of water to dissolve the formed salt, separating the aqueous phase, and recovering the said compound from the organic liquid phase.

3. The method of claim 2 wherein R is a straight chain aliphatic radical containing from 12 to 18 carbon atoms and wherein the acid acceptor is sodium carbonate.

4. The method of claim 3 wherein R is dodecyl.

5. The method of claim 3 wherein R is cetyl.

6. The method of claim 3 wherein R is "soya alkyl."

7. The method of preparing N-lauryl morpholine which comprises heating together and reacting one molar proportion of lauryl amine with two molar proportions of ββ' dichlorethyl ether, in the presence of sodium carbonate as an acid acceptor, and in the presence of water to dissolve the formed salt, removing the excess ether and water by evaporation, filtering the precipitated salt, and recovering the N-lauryl morpholine by vacuum distillation.

8. The method of preparing N-"soya alkyl"

morpholine which comprises heating together and reacting under super-atmospheric pressure one molar proportion of "soya alkyl" amine and three molar proportions of $\beta\beta'$ dichlorethyl ether in the temperature range from 100 to 125° C., in the presence of sodium carbonate as an acid acceptor, and in the presence of water to dissolve the formed salt; separating the aqueous phase, and recovering the N-"soya alkyl" morpholine from the organic liquid phase.

References Cited in the file of this patent

UNITED STATES PATENTS

| Number | Name | Date |
|---|---|---|
| 1,919,301 | Morton | July 25, 1933 |
| 2,129,805 | Wilson | Sept. 13, 1938 |
| 2,439,749 | Niederl et al. | Apr. 13, 1948 |

FOREIGN PATENTS

| Number | Country | Date |
|---|---|---|
| 133,108 | Great Britain | Sept. 26, 1919 |
| 438,452 | Great Britain | Nov. 18, 1935 |
| 474,671 | Great Britain | Oct. 29, 1937 |

OTHER REFERENCES

Hart, J. Amer. Chem. Soc., vol. 66 (1944), p. 1610.

Hart, J. Am. Chem. Soc., vol. 68 (1946), page 714.